US011240276B2

(12) United States Patent
Russo (10) Patent No.: US 11,240,276 B2
(45) Date of Patent: Feb. 1, 2022

(54) COMMUNICATION SYSTEM FOR INTERFACING WITH AN ALARM SYSTEM CONTROL PANEL (71) Applicant: AMETEK, INC., Berwyn, PA (US)

(72) Inventor: Gary Russo, Selden, NY (US)

(73) Assignee: AMETEK, INC., Berwyn, PA (US)

( * ) Notice: Subject to any disclaimer, the term of this patent is extended or adjusted under 35 U.S.C. 154(b) by 0 days.

(21) Appl. No.: 16/938,095

(22) Filed: Jul. 24, 2020

(65) Prior Publication Data
US 2021/0099500 A1 Apr. 1, 2021

Related U.S. Application Data (60) Provisional application No. 62/906,853, filed on Sep. 27, 2019.

(51) Int. Cl.
H04L 29/06 (2006.01)
H04L 12/66 (2006.01)
H04M 7/00 (2006.01)

(52) U.S. Cl.
CPC .......... H04L 65/1069 (2013.01); H04L 12/66 (2013.01); H04M 7/006 (2013.01); H04M 7/0057 (2013.01)

(58) Field of Classification Search
CPC . H04L 12/66; H04L 65/1063; H04L 65/1069; H04M 7/0057; H04M 7/006; H04M 7/1205
See application file for complete search history.

(56) References Cited

U.S. PATENT DOCUMENTS

| 6,614,781 B1* | 9/2003 | Elliott ............... H04L 29/06027 370/352 |
| 2005/0135342 A1* | 6/2005 | Kim .................... H04M 3/4288 370/352 |
| 2007/0058613 A1* | 3/2007 | Beckemeyer ....... H04L 65/1036 370/352 |
| 2007/0223465 A1* | 9/2007 | Wang .................. H04M 7/0057 370/356 |
| 2008/0013531 A1* | 1/2008 | Elliott ................. H04L 65/1026 370/356 |
| 2009/0002149 A1* | 1/2009 | McKelvey ............. H04M 11/04 340/531 |
| 2010/0267390 A1* | 10/2010 | Lin ......................... H04L 51/38 455/445 |

(Continued)

Primary Examiner — Khaled M Kassim
(74) Attorney, Agent, or Firm — RatnerPrestia (57) ABSTRACT A communicator device including a network interface for facilitating internet protocol (IP) communication, a public switched telephone network (PSTN) device interface for facilitating communication with a PSTN device and a processor. The processor is configured to communicate with a user application via an IP connection, receive instructions via the IP connection, generate a telephone ring signal based on the instructions, output the telephone ring signal to the PSTN device via the PSTN device interface, in response to the PSTN device providing a response to the telephone ring signal, establish a tip/ring connection between the PSTN device and the communicator device, and perform a data exchange between the user application and the PSTN device via a communication link that includes the IP connection and the tip/ring connection.

12 Claims, 4 Drawing Sheets (56) References Cited

U.S. PATENT DOCUMENTS

| | | | | |
|---|---|---|---|---|
| 2011/0022683 A1* | 1/2011 | Johan | ................. | H04L 41/0803 |
| | | | | 709/219 |
| 2011/0164734 A1* | 7/2011 | Clark | ............... | H04M 3/42017 |
| | | | | 379/67.1 |

* cited by examiner

COMMUNICATION SYSTEM FOR INTERFACING WITH AN ALARM SYSTEM CONTROL PANEL

CROSS REFERENCE TO RELATED APPLICATION

This application claims benefit of priority from U.S. Provisional Application No. 62/906,853, filed Sep. 27, 2019. The contents of this application are incorporated herein by reference.

FIELD OF THE INVENTION

The subject matter disclosed herein relates to devices, systems and methods for interfacing with an alarm system control panel.

BACKGROUND OF THE INVENTION

Alarm system control panels and various other devices are configured to communicate with customer and service provider devices over the well-known public switched telephone network (PSTN) that includes a network of circuit switched telephone networks including but not limited to telephone lines and cellular networks. Communication for PSTN devices, however, becomes problematic when the PSTN is faulty or unavailable.

SUMMARY OF THE INVENTION

A communicator device including a network interface for facilitating internet protocol (IP) communication, a public switched telephone network (PSTN) device interface for facilitating communication with a PSTN device and a processor. The processor is configured to communicate with a user application via an IP connection, receive instructions via the IP connection, generate a telephone ring signal based on the instructions, output the telephone ring signal to the PSTN device via the PSTN device interface, in response to the PSTN device providing a response to the telephone ring signal, establish a tip/ring connection between the PSTN device and the communicator device, and perform a data exchange between the user application and the PSTN device via a communication link that includes the IP connection and the tip/ring connection.

A communicator system including a user device executing a user application and communication software to communicate with a public switched telephone network (PSTN) device, a server and a communicator device facilitating the communication between the user device and the PSTN device. The communicator system establishes an internet protocol (IP) connection between the communication software of the user device, the server and the communicator device, transmits a telephone number from the user application to the server using the communication software and the IP connection, transmits instructions from the server to the communicator device associated with the telephone number using the IP connection, transmits a telephone ring signal from the communicator device to the PSTN device, the telephone ring signal generated based on the instructions from the server, transmits a response to the telephone ring signal from the PSTN device to the server via the communicator device, and establishes a tip/ring connection between the PSTN device and the communicator device, and performs a download or an upload of data between the user application and the PSTN device via a communication link that includes the IP connection and the tip/ring connection.

A communicator method including executing, by a user device, a user application and communication software to communicate with a public switched telephone network (PSTN) device, facilitating, by a server and a communicator device, the communication between the user device and the PSTN device, establishing an internet protocol (IP) connection between the communication software of the user device, the server and the communicator device, transmitting a telephone number from the user application to the server using the communication software and the IP connection, transmitting instructions from the server to the communicator device associated with the telephone number using the IP connection, transmitting a telephone ring signal from the communicator device to the PSTN device, the telephone ring signal generated based on the instructions from the server, transmitting a response to the telephone ring signal from the PSTN device to the server via the communicator device, and establishing a tip/ring connection between the PSTN device and the communicator device, and performing a download or an upload of data between the user application and the PSTN device via a communication link that includes the IP connection and the tip/ring connection.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Examples of the subject matter disclosed herein are described primarily with respect to alarm systems. It should be apparent, however, that the disclosed subject matter is not so limited. The systems, devices, and methods described herein may be usable in connection with any PSTN device designed to connect or communicate over a PSTN, including for example, security panels, personal emergency devices, etc. Other uses for the examples below will be known from the description herein.

Introduction

An alarm system control panel (e.g. a security/fire alarm panel) monitors various devices (e.g. motion sensors, door/window switch sensors, smoke detectors, sirens, annunciators, lights, etc.) installed at a target location (e.g. a residential/commercial building). The alarm system control panel may perform bi-directional communication with user devices including alarm service provider devices, customer devices and call center devices (e.g. personal computers (PC), smartphones, etc.). Among others, this communication may include reading alarm status information (e.g. sensor trigger events/times, etc.), executing alarm commands (e.g. arm, disarm, etc.), performing software/firmware updates and making settings modifications to the alarm system control panel. Alarm system control panels and various other devices may be configured to communicate over a PSTN using various tones at various durations and delays in a sequence that represent data. Such devices may be referred to as PSTN devices. Providing a way for PSTN devices like alarm system control panels to communicate over an IP network may be beneficial in instances where the PSTN is faulty or otherwise unavailable. However, it is difficult and impractical to modify these PSTN devices to perform such IP communication. Therefore, it is beneficial to provide an interface device/method that allows a PSTN device to continue to communicate using PSTN tones (e.g. transmit, receive and process the tones) as normal, while seamlessly converting the PSTN tones to IP data and vice versa to interface the PSTN to the IP network. In the examples below, communication between the alarm system control panel and the user devices may be facilitated by a combination of a PSTN communication and an IP communication with the aid of a PSTN device interface that is connected to the PSTN device and communication software (e.g. a driver) running on the user device. The PSTN device interface converts PSTN signals to IP data and vice versa in order to translate between the PSTN communication used by the PSTN device and the IP communication used by the server and the user device. The communication software (e.g. a driver) converts software application data/instructions to IP data and vice versa.

Figure 1:
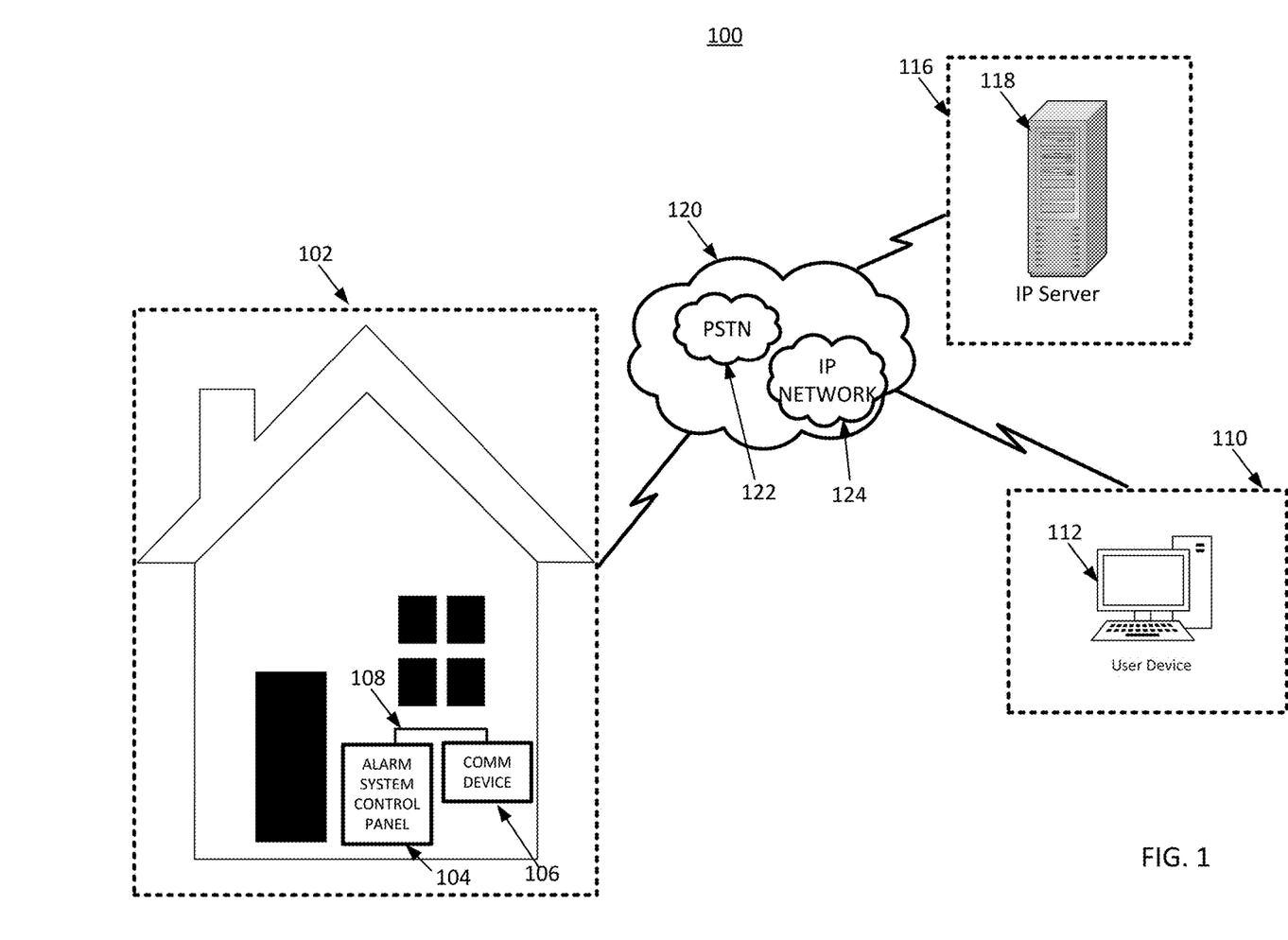
FIG. 1 is an alarm system diagram showing communication connections between the alarm system control panel, a communicator device, a service provider device and an IP server, according to an aspect of the disclosure.

FIG. 1 is an example of an alarm panel communication system 100 including devices configured to communicate via PSTN 122 and IP network 124. For example, a PSTN device such as an alarm system control panel 104 (e.g. residential alarm device) is located at an alarm system control panel location 102 (e.g. a residential house). Alarm system control panel 104 is connected to communicator device 106 (e.g. PSTN device interface) via connection 108 (e.g. tip/ring wiring). Also included in the system is an IP service location 116 (e.g. IP network support device) including IP server 118, and a user device location 110 (e.g. alarm system service provider location, alarm system call center, customer device, etc.). In one example, user device 112 may be a PC located at the alarm service provide location for handling device configuration and account management. In another example, user device 112 may be a PC located at a service location (e.g. call center) that handles alarm signaling. In yet another example, user device 112 may be a customer PC that is used to monitor alarm status.

In general, during operation, alarm system control panel 104 communicates with user device 112 in two primary ways. In a configuration where PSTN 122 is available, alarm system control panel 104 communicates with user device 112 via PSTN 122 of network 120. In a configuration, however, where PSTN 122 is not available or is faulty, alarm system control panel 104, with the aid of IP server 118, communicator device 106, and communication software running on the user device 112, communicates with user device 112 via IP network 124 of network 120.

Normally, alarm system control panel 104 communicates over the PSTN 122 to push or upload information to the user device 112 (e.g. the alarm monitoring station). In addition, PSTN alarm system control panel 104 communicates over the PSTN 122 when an alarm service provider needs to configure or manage the alarm equipment (e.g. alarm system control panel 104). Thus, PSTN 122 may be used for various communications including uploads, downloads and alarm event messaging. For example, communication through the PSTN may include, but is not limited to alarm push notifications via short message service (SMS) messages sent to user device 112 in response to an alarm event (e.g. alarm trigger, valid security code entered, invalid security code entered, etc.), software/firmware upgrades and setting updates.

In contrast, when the PSTN 122 is faulty or unavailable, the communication including the uploads (e.g. alarm event history, current settings information, alarm triggers, etc.) and/or downloads (e.g. software/firmware upgrades, setting updates, alarm commands, etc.) of data between alarm system control panel 104 and user device 112 is exchanged via IP network 124 of network 120 with the aid of IP server 118, communicator device 106 and communication software running on the user device 112.

System Hardware

Figure 2:
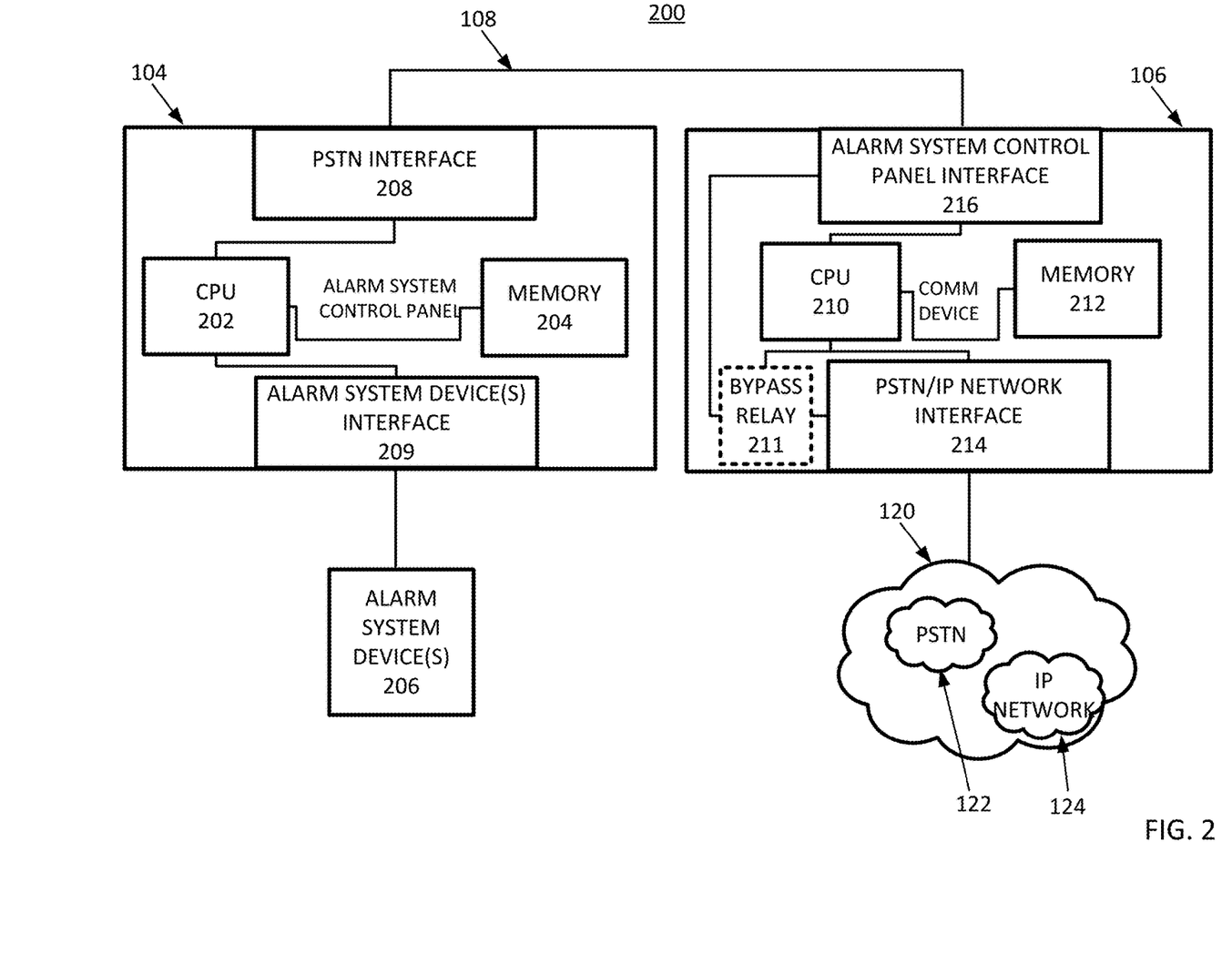
FIG. 2 is a hardware diagram showing communication connections between the alarm system control panel and the communicator device, according to an aspect of the disclosure.

As described above, communicator device 106 acts as a PSTN device interface between alarm system control panel 104 and the IP network 124. FIG. 2 is a detailed hardware diagram 200 of alarm system control panel 104, communicator device 106, and their respective connections to each other and to the networks.

In this example, alarm system control panel 104 includes memory device 204 for storing programming code, alarm device(s) 206 (e.g. sensor, siren, annunciators, keypads, etc.), PSTN interface 208 for connecting alarm system control panel 104 to PSTN 122 via connection 108 (e.g. tip/wring wiring), alarm system device(s) interface 209 for connecting alarm system control panel 104 to alarm system device(s) 206, and central processing unit (CPU) 202 for controlling, based on the programing code in memory device 204, the operation of alarm system control panel 104 and facilitating bi-directional communication with communicator device 106 via PSTN interface 208.

Communicator device 106 includes memory device 212 for storing programming code, PSTN/IP network interface 214 for connecting communicator device 106 to PSTN 122 and to IP network 124, alarm system control panel interface 216 for connecting communicator device 106 to alarm system control panel 104, and CPU 210 for facilitating, based on the programing code in memory device 212, bi-directional communication with alarm system control panel 104 via alarm system control panel interface 216 and bi-directional communication with user device 112 and IP server 118 via PSTN/IP network interface 214. In addition, communicator device 106 may include an optional bypass relay 211 that bypasses the functionality of communicator device 106 by connecting alarm system control panel interface 216 directly to PSTN/IP network interface 214 (e.g. alarm system control panel 104 is connected directly to PSTN 122) when PSTN 122 is operational. When PSTN 122 is not operational, bypass relay 211 does not connect alarm system control panel interface 216 directly to PSTN/IP network interface 214, such that communication is processed by communicator device 106.

Operational Examples

Figure 3:
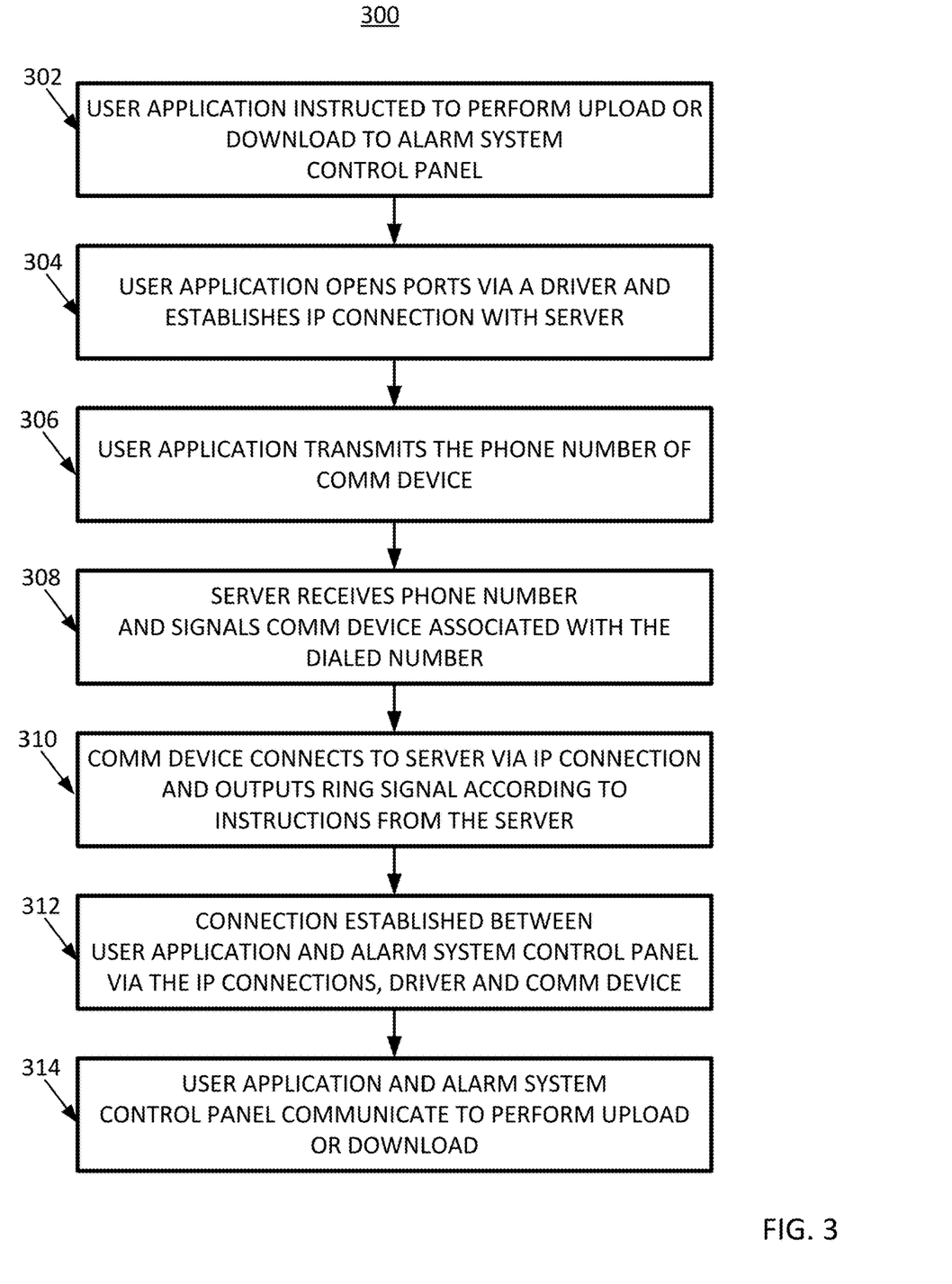
FIG. 3 is a flowchart describing the operation of the alarm system, according to an aspect of the disclosure.

As described above, when PSTN 122 is available, bypass relay 211 bypasses the processing of communicator device 106 and connects alarm system control panel 104 directly to PSTN 122. In contrast, when the PSTN 122 is not available or is faulty, alarm system control panel 104 communicates over IP network 124 with the aid of communicator device 106. FIG. 3 is a flowchart 300 describing an example operation of alarm system control panel 104 when performing an upload or a download to/from IP server 118 and/or user device 112 with the aid of communicator device 106 and communication software running on the user device 112.

In a first step 302, user device 112 opens a software application which is instructed by the user (e.g. alarm system customer, alarm system service center employee, alarm system call center employee, etc.) to perform an upload and/or a download to alarm system control panel 104. Examples of an upload include retrieving, among others, alarm event data and alarm settings data from alarm system control panel 104, or any other data stored by alarm system control panel 104. Examples of a download include sending, among others, updated alarm settings data, arm/disarm commands, software updates and firmware updates to alarm system control panel 104 or any other commands/data relevant to the operation of alarm system control panel 104.

In either the upload or the download scenario, in step 304, the communication software (e.g. driver) running on user device 112 opens appropriate ports in response to instructions from the user application. The driver then communicates with IP server 118 to establish an IP connection. Once the IP connection between the driver of user device 112 and IP server 118 is established, the user application of user device 112, in step 306, transmits the phone number of communicator device 106 to IP server 118 via the IP connection. The phone number is an exclusive number used by user device 112, or any other device, to communicate with alarm system control panel 104 via PSTN 122 (when PSTN 122 is available), and to communicate with communicator device 106 via IP network 124 (when PSTN 122 is unavailable or faulty). Upon reception of the phone number from the user device 112, in step 308, IP server 118 uses the phone number to identify communicator device 106 associated with the phone number and sends control signals (SMS or IP signals) to communicator device 106 to establish an IP connection. Upon reception of the control signals from IP server 118, communicator device 106, in step 310, establishes an IP connection with server 118. In response to instructions from server 118, communicator device 106 generates a telephone ring signal which is then output to alarm system control panel 104.

When alarm system control panel 104 detects the ring or a predetermined ring sequence, it goes off hook and establishes a connection in step 312 facilitated by back and forth communication with IP server 118 via communicator device 106. The telephone ring signal and the back and forth communication may include a sequence of various tones of various durations, and/or delays of varying length between such tones, between alarm system control panel 104 and communicator device 106. Communicator device 106 translates a sequence of various tones, durations, and/or delays received from alarm system control panel 104 to IP data which is forwarded to IP server 118. Likewise, communicator device 106 translates IP data received from IP server 118 into a sequence of various tones which is output to alarm system control panel 104. This back and forth process connects alarm system control panel 104 with user device 112 through a combination of a local PSTN connection (e.g. tip/ring connection) between alarm system control panel 104 and communicator device 106, and an IP connection between communicator device 106, IP server 118 and the driver of user device 112.

For example, the user application may send a dial command (e.g. ATD5551212) to IP server 118, at which point the ring on period starts. The user application sends a command to stop the ring on period to IP server 118. Ring on time is calculated and ring off period starts. The user application sends a dial command to IP server 118, such that ring off period is calculated, ring on period starts. IP server 118 uses ring on and off events to replicate the ring on and off periods to match the pattern (e.g. sequence) created by the user application. IP server 118 then controls communicator device 106 to start and stop ring generation based on the measured information. The ring sequence may be determined based on the type (e.g. manufacturer, model, etc.) of alarm system control panel 104.

Communicator device 106 acts as a PSTN device interface to translate between the PSTN communication protocol used by PSTN devices such as alarm system control panel 104 and the IP communication used by IP server 118 and the driver of the user device. This maintains the ability of alarm system control panel 104 (or any PSTN device) to communicate with user device 112 without the use of PSTN 122. Specifically, communicator device 106 facilitates a local PSTN type communication loop expected by alarm system control panel 104 where current flows, carrier tones are established, and data exchanged as described above, while also facilitating IP communication with the IP server.

Once the connection is established between the user device 112 and alarm system control panel 104, the user application, in step 314 communicates with alarm system control panel 104 during the communication session to perform an upload and/or a download of data. As described above, this could include, among others, retrieving alarm event data and alarm settings data from alarm system control panel 104 and/or sending updated alarm settings data, software updates, firmware updates, and arm/disarm commands, to alarm system control panel 104. Once the data transfer is complete, alarm system control panel 104 goes on hook to end the connection and therefore end the communication session.

Figure 4:
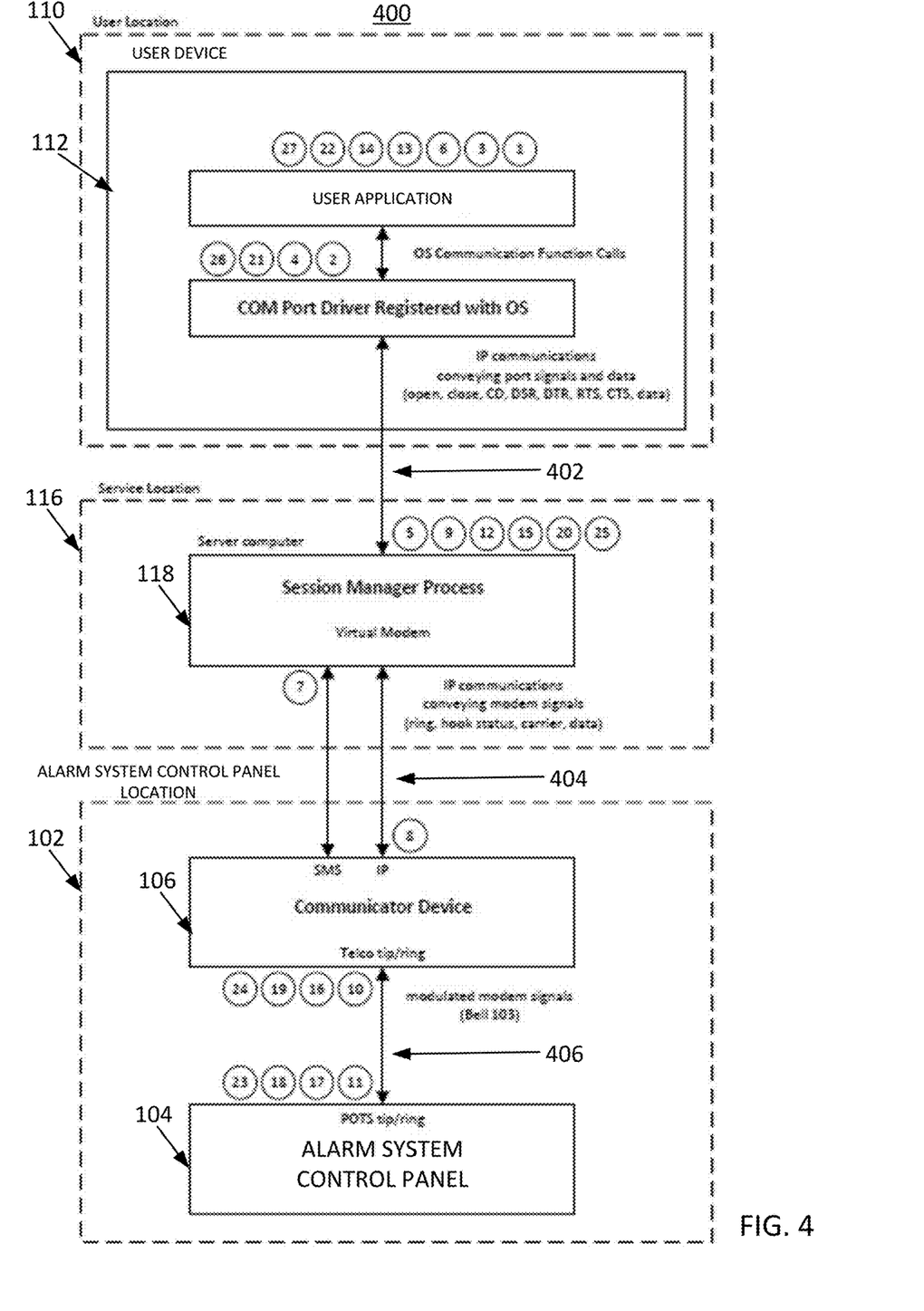
FIG. 4 is another flowchart describing the operation of the alarm system, according to an aspect of the disclosure.

As described above, the flowchart in FIG. 3 describes an example operation of alarm system control panel 104 when performing a data upload or download. In order to further illustrate this process, FIG. 4 shows the detailed data flow between the user device 112, IP server 118, communicator device 106 and alarm system control panel 104.

In step 1, a user application (e.g. alarm system application) running on user device 112 executes instructions (e.g. operating system (OS) function calls) requesting communication ports on the user device to be open. In response to the OS function calls, in step 2, a driver of user device 112 establishes an IP connection 402 with IP server 118. In response to the IP connection being established, in steps 3, 4, 5 and 6, the user application calls to set signal states, reads signal states, and transmits/receives data, the driver conveys the signals and data between the user application and IP server 118, and the IP server 118 (acting as a virtual modem) processes the signals, generate signals and transmits/receives data.

In step 6, when attempting to connect to the alarm system control panel, the user application configures the virtual modem and dials the connection phone number for communicator device 106. In step 7, the virtual modem processes the connection phone number, identifies communicator device 106, and sends a start signal to communicator device 106. Upon receiving the start signal, communicator device 106, in step 8, establishes an IP connection 404 with IP server 118. This allows IP server 118, acting as the IP session manager, to be able to control communicator device 106 in step 9.

Once the IP connections are established, communicator device 106, in step 10, receives instructions from IP server 118 via IP connection 404 and generates a PSTN ring signal based on the instructions. In one example, the instructions may be the ring sequence determined based on the type (e.g. manufacturer, model, etc.) of alarm system control panel 104 as indicated by the user application. The generated PSTN ring signal is sent to alarm system control panel 104 via local (e.g. tip/ring) connection 406 (e.g. analog two-wire circuit). In step 11, upon detecting the PSTN ring signal, alarm system control panel 104 goes off-hook. In step 12, IP server 118 receives hook and answer tones status from alarm system control panel 104 via communicator device 106, and IP server 118 controls ring and calling tones to establish local tip/ring connection 406 with alarm system control panel 104. In this configuration, communicator device 106 acts as an intermediary in order to translate between the IP connection with IP server 118 and the local connection with alarm system control panel 104.

In step 13, the user application, via the driver, is notified of the successful connection between IP server 118 and alarm system control panel 104. This allows the user application to communicate with alarm system control panel 104 via the driver, IP server 118 and communicator device 106.

For example, in step 14, the user application may start forwarding data to IP server 118 via the driver and IP connection 402. Upon receiving the data from the user application, IP server 118 forwards the data via the IP connection 404, in step 15, to communicator device 106. In step 16, communicator device 106 then modulates the received data onto a carrier tone and transmits the modulated carrier tone over the local tip/ring connection 406 to alarm system control panel 104 which receives the data in step 17.

In step 18, alarm system control panel 104 may start to forward data to communicator device 106 by modulating the data onto the carrier tone and transmitting the modulated data over the local tip/ring connection 406. Upon receiving the data, communicator device 106 forwards the data to server 118 in step 19. IP server 118, in step 20, then forwards the data to the driver of user device 112. In steps 21 and 22, the driver provides the received data to the user application. The driver of user device 112 effectively translates the application data to IP data and vice versa.

Steps 14-22 described above may be performed and repeated as needed to facilitate bidirectional communication between the user application and alarm system control panel 104. As described above, this may include downloads (e.g. software/firmware updates, settings updates, and alarm commands such as arm/disarm, etc.) from the user application to alarm system control panel 104, and uploads (e.g. alarm events, alarm settings, alarm history, etc.) from alarm system control panel 104 to the user application.

Once the communication (e.g. upload/download) is complete, alarm system control panel 104, in step 23, ends the connection by going on-hook which removes the carrier from the local tip/ring connection 406. The end of the session may be initiated by the alarm system control panel 104 or the user application. Upon detecting the on-hook and carrier status, communicator device 106, in step 24, forwards the status to IP server 118 which detects loss of carrier and generates signals and a response to indicate the loss of carrier, in step 25. In step 26, the driver of user device 112 receives the signals and the response from the IP server 118 and forwards them to the user application. Upon reception, in step 27, the user application executes instructions to close the communication port. In response to the instructions, the driver of user device 112 closes the IP connection with IP server 118 and ends the IP session.

Although the examples described above are directed to an alarm system control panel, it is noted that alarm system control panel 104 may be any PSTN device (e.g. personal emergency devices, or any device that communicates using PSTN). In either scenario, communicator device 106 acts as a PSTN device interface that interfaces any PSTN device with an IP network.

The steps in FIGS. 3 and 4 may be performed by the alarm system control panel, communicator device, IP server and/or user devices in FIGS. 1 and 2, upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. In one example, data are encrypted when written to memory, which is beneficial for use in any setting where privacy concerns such as protected health information is concerned. Any of the functionality performed by the computer described herein, such as the steps in FIGS. 3 and 4 may be implemented in software code or instructions which are tangibly stored on a tangible computer readable medium. Upon loading and executing such software code or instructions by the computer, the controller may perform any of the functionality of the computer described herein, including the steps in FIGS. 3 and 4 described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A communicator device comprising:
a network interface for facilitating internet protocol (IP) communication with a server and a user device;
a public switched telephone network (PSTN) device interface for facilitating communication with a PSTN device; and
a processor configured to:
receive, a start signal from the server to establish a second IP connection between the server and the communicator device, the start signal being received in response to the user device establishing, by a driver executed by the user device, a first IP connection between the user device and the server, conveying, by a user application executed by the user device to the server via the first IP connection, port signals and port data from ports of the user device to configure the server to operate as a virtual modem, processing, by the server, the port signals and port data to configure the server to operate as the virtual modem, and the transmitting, by the user application executed by the user device via the first IP connection, a telephone number of the communicator device to the server, and transmitting, by the server, the start signal to the communicator device,
receive instructions from the server via the second IP connection to generate a telephone ring signal,
generate the telephone ring signal based on the instructions,
output the telephone ring signal to the PSTN device via the PSTN device interface,
in response to the PSTN device providing a response to the telephone ring signal to the communicator device, establish a tip/ring connection between the PSTN device and the communicator device by:
transmitting, from the communicator device to the server, detected tones received from the PSTN device,
receiving, by the communicator device from the server, instructions for generating response tones, and
generating and transmitting, from the communicator device to the PSTN device, the response tones to establish the tip/ring connection,
transmit status information including port signals and port data, from the communicator device to the user device indicating that the tip/ring connection is established, and
upon indicating that the tip/ring connection is established, perform a data exchange between the user application and the PSTN device via a communication link that includes the first IP connection, the second IP connection and the tip/ring connection.

2. The communicator device of claim 1, wherein the processor is further configured to receive hook and answer tones output by the PSTN device in response to the telephone ring signal in order to establish the tip/ring connection between the communicator device and the PSTN device.

3. The communicator system of claim 1, wherein the processor is further configured to modulate user application data onto a carrier tone to transmit the user application data to the PSTN device, and demodulate PSTN device data from the carrier tone to transmit the PSTN device data to the user application.

4. The communicator device of claim 1, wherein the data exchange between the user application and the PSTN device includes one or both of uploading data and downloading data, the uploaded or downloaded data including at least one of software settings, event data, software updates, firmware updates of the PSTN device, or commands for controlling the PSTN device.

5. A communicator system comprising:
a user device executing a user application and communication software to communicate with a public switched telephone network (PSTN) device; and
a server and a communicator device facilitating the communication between the user device and the PSTN device;
wherein the communicator system:
establishes, by a driver executed by the user device, a first internet protocol (IP) connection between the user device and the server,
conveys, by a user application executed by the user device to the server via the first IP connection, port signals and port data from ports of the user device to configure the server to operate as a virtual modem,
transmits, by the user application executed by the user device via the first IP connection, a telephone number of the communicator device to the server,
processes, by the server, the port signals and port data to configure the server to operate as the virtual modem, and the telephone number to identify the communicator device and transmit a start signal to the communicator device to establish a second IP connection between the server and the communicator device,
transmits, by the server to the communicator device via the second IP connection, instructions to generate a telephone ring signal,
transmits, by the communicator device to the PSTN device, the telephone ring signal generated based on the instructions from the server,
transmits, by the PSTN device to the communicator device, a response to the telephone ring signal, and
establishes a tip/ring connection between the PSTN device and the communicator device by:
transmitting, from the communicator device to the server, detected tones received from the PSTN device,
receiving, by the communicator device from the server, instructions for generating response tones, and
generating and transmitting, from the communicator device to the PSTN device, the response tones to establish the tip/ring connection, transmit status information including port signals and port data, from the communicator device to the user device indicating that the tip/ring connection is established, and upon indicating that the tip/ring connection is established, performs a download or an upload of data between the user application and the PSTN device via a communication link that includes the first IP connection, the second IP connection and the tip/ring connection.

6. The communicator system of claim 5, wherein in order to facilitate the tip/ring connection between the PSTN device and the communicator device, the communicator system is further configured to generate and transmit a specific sequence of tones to the PSTN device based on the server instructions, and transmit hook and detected tones from the PSTN device to the server.

7. The communicator system of claim 5, wherein the communicator system is further configured to modulate by the communicator device, user application data onto a carrier tone to transmit the user application data to the PSTN device, and demodulate by the communicator device, PSTN device data from the carrier tone to transmit the PSTN device data to the user application.

8. The communicator system of claim 5, wherein the uploaded or downloaded data includes at least one of software settings, information recorded by the PSTN device, commands for controlling the PSTN device, software updates, or firmware updates of the PSTN device.

9. A communicator method comprising:

executing, by a user device, a user application and a driver to communicate with a public switched telephone network (PSTN) device;

facilitating, by a server and a communicator device, the communication between the user device and the PSTN device;

establishing, by the driver executed by the user device, a first an internet protocol (IP) connection between the communication software of the user device and the server;

conveying, by the user application executed by the user device to the server via the first IP connection, port signals and port data from ports of the user device to configure the server to operate as a virtual modem;

transmitting, by the user application executed by the user device via the first IP connection, a telephone number of the communicator device to the server;

processing, by the server, the port signals and port data to configure the server to operate as the virtual modem, and the telephone number to identify the communicator device and transmit a start signal to the communicator device to establish a second IP connection between the server and the communicator device;

transmitting, by the server to the communicator device via the second IP connection, instructions to generate a telephone ring signal;

transmitting, by the communicator device to the PSTN device, the telephone ring signal generated based on the instructions from the server;

transmitting, by the PSTN device to the communicator device, a response to the telephone ring signal, and establishing a tip/ring connection between the PSTN device and the communicator device by:

transmitting, from the communicator device to the server, detected tones received from the PSTN device, receiving, by the communicator device from the server, instructions for generating response tones, and generating and transmitting, from the communicator device to the PSTN device, the response tones to establish the tip/ring connection, transmit status information including port signals and port data, from the communicator device to the user device indicating that the tip/ring connection is established; and upon indicating that the tip/ring connection is established, performing a download or an upload of data between the user application and the PSTN device via a communication link that includes the first IP connection, the second IP connection and the tip/ring connection.

10. The communicator method of claim 9, further comprising:

in order to facilitate the tip/ring connection between the PSTN device and the communicator device, generating and transmitting a specific sequence of tones to the PSTN device based on the server instructions, and transmitting hook and detected tones from the PSTN device to the server.

11. The communicator method of claim 9, further comprising:

modulating, by the communicator device, user application data onto a carrier tone to transmit the user application data to the PSTN device, and demodulating, by the communicator device, PSTN device data from the carrier tone to transmit the alarm data to the user application.

12. The communicator method of claim 9, further comprising:

including at least one of software settings, information recorded by the PSTN device, commands for controlling the PSTN device, software updates, or firmware updates of the PSTN device in the uploaded or downloaded data.

* * * * *